US008309878B2

(12) United States Patent
Winn

(10) Patent No.: US 8,309,878 B2
(45) Date of Patent: Nov. 13, 2012

(54) UNIVERSAL INPUT POWER SUPPLY UTILIZING PARALLEL POWER MODULES

(75) Inventor: Jackie Winn, Mt. Pleasant, SC (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 450 days.

(21) Appl. No.: 12/649,788

(22) Filed: Dec. 30, 2009

(65) Prior Publication Data

US 2011/0155703 A1    Jun. 30, 2011

(51) Int. Cl.
*H05H 1/36* (2006.01)
*B23K 9/10* (2006.01)
*B23K 9/00* (2006.01)

(52) U.S. Cl. ......... 219/121.54; 219/121.11; 219/121.36; 219/50; 323/234; 363/135; 363/15; 363/17; 363/34; 363/65

(58) Field of Classification Search ............. 219/121.54; 363/34, 35, 36, 239
See application file for complete search history.

(56) References Cited

U.S. PATENT DOCUMENTS

| | | | | |
|---|---|---|---|---|
| 4,270,165 A * | 5/1981 | Carpenter et al. | ............... | 363/65 |
| 5,272,313 A * | 12/1993 | Karino et al. | ............ | 219/130.21 |
| 5,811,757 A * | 9/1998 | Higgins | ................... | 219/137 PS |
| 5,864,110 A * | 1/1999 | Moriguchi et al. | ...... | 219/121.57 |
| 5,889,661 A * | 3/1999 | Tamura et al. | ................... | 363/37 |
| 5,926,381 A * | 7/1999 | Moriguchi et al. | ............. | 363/17 |
| 6,054,674 A * | 4/2000 | Moriguchi et al. | ...... | 219/130.21 |
| 6,177,645 B1 * | 1/2001 | Church et al. | ........... | 219/121.39 |
| 6,291,798 B1 * | 9/2001 | Stava | ........................ | 219/130.32 |
| 6,365,868 B1 * | 4/2002 | Borowy et al. | ........... | 219/121.54 |
| 6,504,132 B1 * | 1/2003 | Church | ....................... | 219/130.1 |
| 6,849,827 B2 * | 2/2005 | Thommes | ................ | 219/130.21 |
| 7,109,438 B2 * | 9/2006 | Ishii et al. | ................ | 219/130.21 |
| 7,235,759 B2 * | 6/2007 | Geissler | ...................... | 219/130.1 |
| RE39,926 E * | 11/2007 | Morimoto et al. | ............... | 363/17 |
| 7,319,206 B2 * | 1/2008 | Thommes | .................. | 219/130.1 |
| 7,336,512 B2 | 2/2008 | Geissler | | |
| 2002/0109487 A1 * | 8/2002 | Telefus et al. | ................. | 323/239 |
| 2009/0196082 A1 * | 8/2009 | Mazumder et al. | ........... | 363/132 |
| 2011/0155702 A1 * | 6/2011 | Winn | ....................... | 219/121.51 |

OTHER PUBLICATIONS

PCT International Search Report for PCT/US2010/061453, dated Feb. 15, 2011.

* cited by examiner

*Primary Examiner* — Wai Sing Louie
*Assistant Examiner* — William Harriston
(74) *Attorney, Agent, or Firm* — Dority & Manning, P.A.

(57) ABSTRACT

A universal power supply for use in a plasma arc system is disclosed. The power supply can include a plurality of power modules for providing a DC output from an AC input. Each of the power modules can include a rectifier, a converter, an inverter, an isolation transformer and an output rectifier. The power modules can include a power module controller configured to control at least one of the rectifier, the converter, or the inverter such that a DC output can be obtained from a wide variety of AC inputs. The power modules can be connected in parallel to provide a wide range of DC output currents for the power supply. The universal power supply can include a master controller coupled to each of the individual power module controllers to regulate the DC output current of the power supply by controlling the individual power module controllers.

17 Claims, 4 Drawing Sheets

UNIVERSAL INPUT POWER SUPPLY UTILIZING PARALLEL POWER MODULES

FIELD OF THE INVENTION

The present disclosure generally relates to power supplies and more particularly to a universal power supply for use in a plasma arc system.

BACKGROUND OF THE INVENTION

Plasma arc systems can be used for a variety of cutting or welding applications. Typically, plasma arc systems apply an electric current through an ionized gas or plasma to form a plasma arc. The plasma is sufficiently hot to melt the workpiece in order to cut or weld the workpiece.

Plasma arc systems can require significant amounts of power to generate and sustain the plasma arc. Various power supplies for supplying power to plasma arc systems exist. These power supplies typically receive a high voltage AC input from a mains supply or other power source and provide the high power output necessary to support the plasma arc.

One type of power supply for a plasma arc system is a buck converter or chopper type plasma power supply. Chopper plasma power supplies can be used to provide a high DC output current, such as about 10 amperes to about 400 amperes, that is used by the plasma arc system to generate the plasma. Chopper type plasma power supplies consist of a large 50/60 Hz isolation transformer followed by one or more choppers connected in parallel.

For instance, FIG. 1 depicts a conceptual diagram of an exemplary conventional chopper plasma power supply 10. Power supply 10 includes a large isolation transformer 12 followed by a plurality of chopper circuits $IC_1$, $IC_2$, ... $IC_n$ connected in parallel. Each chopper circuit $IC_1$, $IC_2$, ... $IC_n$ includes a rectifier 22 for converting the AC output of isolation transformer 12 to a DC signal for a DC bus 24. A chopper 26 converts the DC signal from DC bus 24 utilizing known pulse width modulation (PWM) techniques to generate a unipolar pulse signal having a high frequency, such as about 10 kHz to about 25 kHz. An inductor 28 filters the pulse signal provided by chopper 26 to produce DC outputs $I_2$, $I_2$, ... $I_n$. The DC outputs $I_2$, ... $I_n$ of each of the chopper circuits $IC_1$, $IC_2$, ... $IC_n$ are combined to provide the desired DC output current $I_{DC\ OUTPUT}$ for the power supply.

To accommodate the various AC power supply inputs available throughout the world, a chopper supply typically must utilize a large front end isolation transformer having multiple taps or the chopper supply must utilize multiple transformers to accommodate different voltages, leading to increased inventory and costs.

Power supplies that include converter circuits to avoid the need for large front end isolation transformers exist. For instance, U.S. Pat. No. 6,849,827 discloses a method and apparatus for receiving a universal input voltage in a welding power source. However, these power supplies can be limited in output DC current rating. To increase the output current rating of such power supplies, higher rated power devices, such as higher rated fast recovery diodes, IGBTs and high frequency magnetics, typically must be used in the converter circuits, leading to increased costs. Moreover, these components may be limited in their current and or switching characteristics limiting their use to the lower output currents required for plasma systems. This prevents these types of converters from being used to provide high output currents from a wide range of AC power source inputs as desired.

Thus, a need exists for a universal power supply that is capable of efficiently providing a wide range of high DC output currents from a wide range of AC power supply inputs that overcomes the above mentioned disadvantages.

SUMMARY

Aspects and advantages of the invention will be set forth in part in the following description, or may be obvious from the description, or may be learned through practice of the invention.

One exemplary embodiment of the present disclosure is directed to a power supply for supplying a DC output current for use in a plasma arc system. The power supply can include a plurality of power modules connected in parallel. Each power module can provide a DC output from an AC input and can include a rectifier, a converter, an inverter, and a power module controller. The power module controller can be configured to control at least one of the rectifier, the converter or the inverter to regulate the DC output of the power module. The power supply can further include a master controller coupled to each of the power module controllers. The master controller can be configured to regulate the DC output current of the power supply by controlling the individual power module controllers for each power module.

Another exemplary embodiment of the present disclosure is directed to a method for providing a DC output current for use in a plasma arc system. The method can include providing an AC input to a plurality of power modules connected in parallel and rectifying the AC input in each power module with a rectifier to provide a first DC signal. The method can further include converting the first DC signal to a second DC signal in each power module with a converter, converting the second DC signal to an AC signal with an inverter, and rectifying the AC signal with an output rectifier to provide a DC output for each power module. The method can further include providing a control signal to a power module controller for each power module and controlling at least one of the rectifier, the converter or the inverter of the power module to regulate the DC output of the power module.

A further exemplary embodiment of the present disclosure is directed to a universal power supply for use in a plasma arc system. The universal power supply can include a plurality of power modules connected in parallel to provide the DC output current. Each of the power modules can be configured to receive an AC input and provide a DC output. Each power module can include a rectifier configured to receive the AC input and provide a first DC signal, a converter coupled to the rectifier that can be configured to receive the first DC signal and provide a second DC signal, an inverter coupled to the converter that can be configured to receive the second DC signal and provide a first AC signal, an isolation transformer coupled to the inverter that can be configured to receive the first AC signal and provide a second AC signal, and an output rectifier coupled to the isolation transformer that can be configured to receive the second AC signal and provide the DC output. The universal power supply can further include a control system having a plurality of power module controllers and a master controller. Each of the power module controllers can be configured to regulate the DC output of one of the power modules by controlling at least one of the rectifier, the converter, or the inverter of the power module. The master controller can control the DC output current of the universal power supply by controlling each of the power module controllers.

Variations and modifications can be made to these exemplary embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE DRAWINGS

Figure 1:
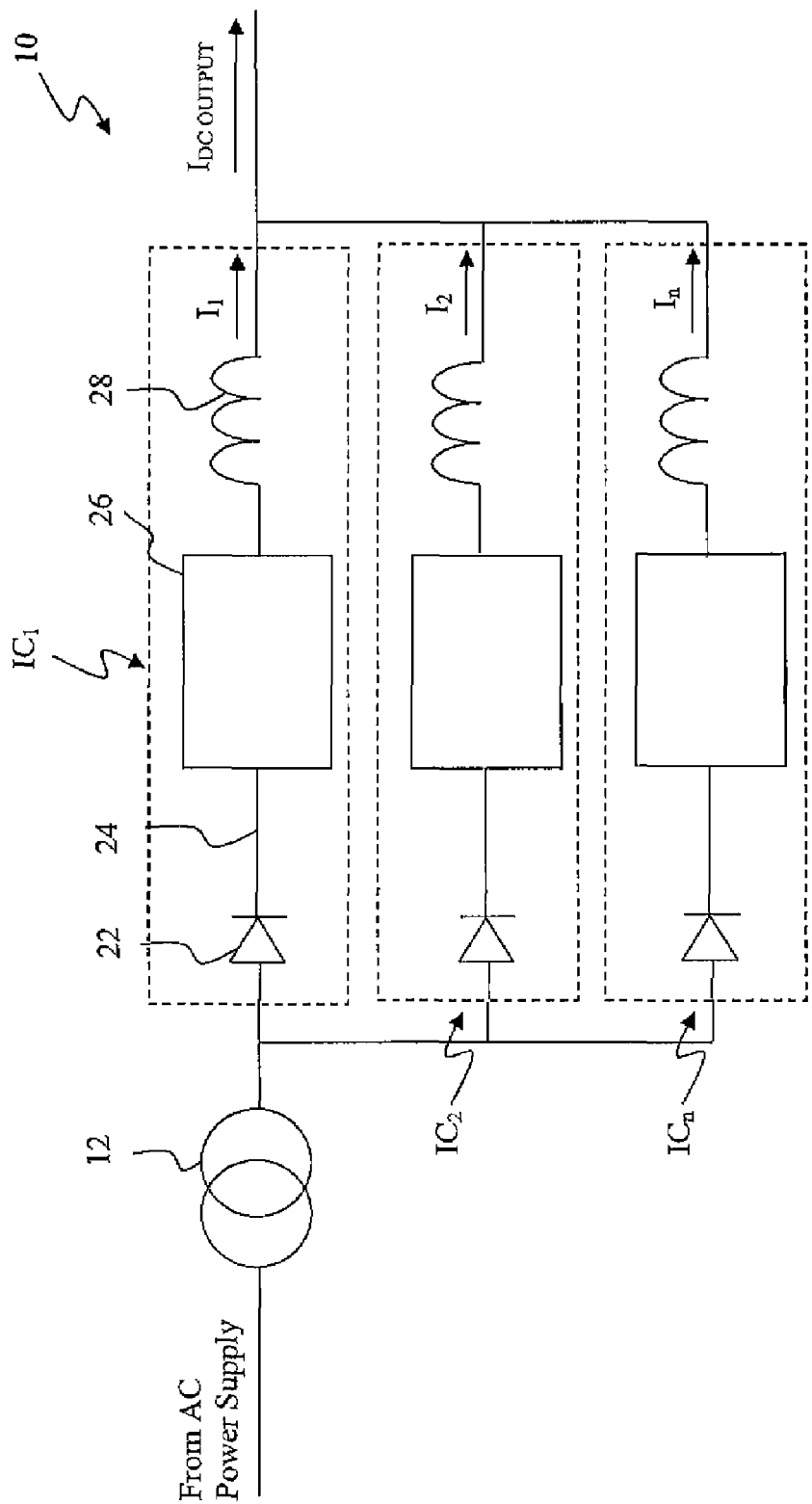
FIG. 1 depicts a conceptual diagram of an exemplary conventional chopper power supply for use in a plasma arc system.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Generally, the present disclosure is directed to a universal power supply for a plasma arc system. The power supply can be configured to receive an AC input from a mains supply or other power source and provide a DC output current. The DC output current can be used by the plasma arc system to sustain a plasma arc.

In accordance with an exemplary embodiment of the present disclosure, the universal power supply can include a plurality of power modules. Each of the power modules is configured to receive an AC input and provide a DC output. The power modules include a rectifier configured to rectify the AC input signal and provide a first DC signal. The power module further includes a converter configured to receive the first DC signal and provide a second DC signal. The power module further includes an inverter that converts the second DC signal into a high frequency AC signal. The high frequency AC signal is provided to a relatively small isolation transformer to an output rectifier to provide a DC output. The output rectifier can have a ripple frequency based at least in part on the frequency of the AC signal provided by the inverter.

A power module according to exemplary embodiments of the present disclosure can accommodate a wide variety of input AC sources and voltages without having to use large isolation transformers with multiple taps and without having to use multiple input transformers. The plurality of power modules can be connected in parallel to achieve a wide range of DC current outputs without having to increase the power ratings of the electronic devices used in the individual power modules. Indeed, by paralleling an appropriate number of power modules, a relatively high level of DC output current can be achieved while using smaller, relatively inexpensive power devices, such as diodes, IGBTs, and transformers, in the individual power modules.

The individual power modules can include a power module controller that controls at least one of the rectifier, the converter, or the inverter to regulate the DC output of the power module. The power supply can further include a master controller configured to control the plurality of individual power module controllers. The DC output current of the power supply can thus be regulated by sending control signals from the master controller to the plurality of individual power module controllers.

By controlling at least one of the rectifier, the converter or the inverter, a individual power module can efficiently accommodate any input AC source voltage, and, in combination with the other power modules connected in parallel, can also efficiently provide a wide range of DC output currents. Accordingly, a single universal power supply can be provided for a wide variety of different plasma arc applications. The universal power supply can lead to significant costs savings and increases in efficiency. For instance, because a single universal power supply can be used in a wide variety of different applications, only one type of universal power supply needs to be manufactured and/or stored. In addition, because similar parts can be used to manufacture each universal power supply, higher volume purchases for such similar parts can lead to volume discounts from suppliers.

Figure 2:
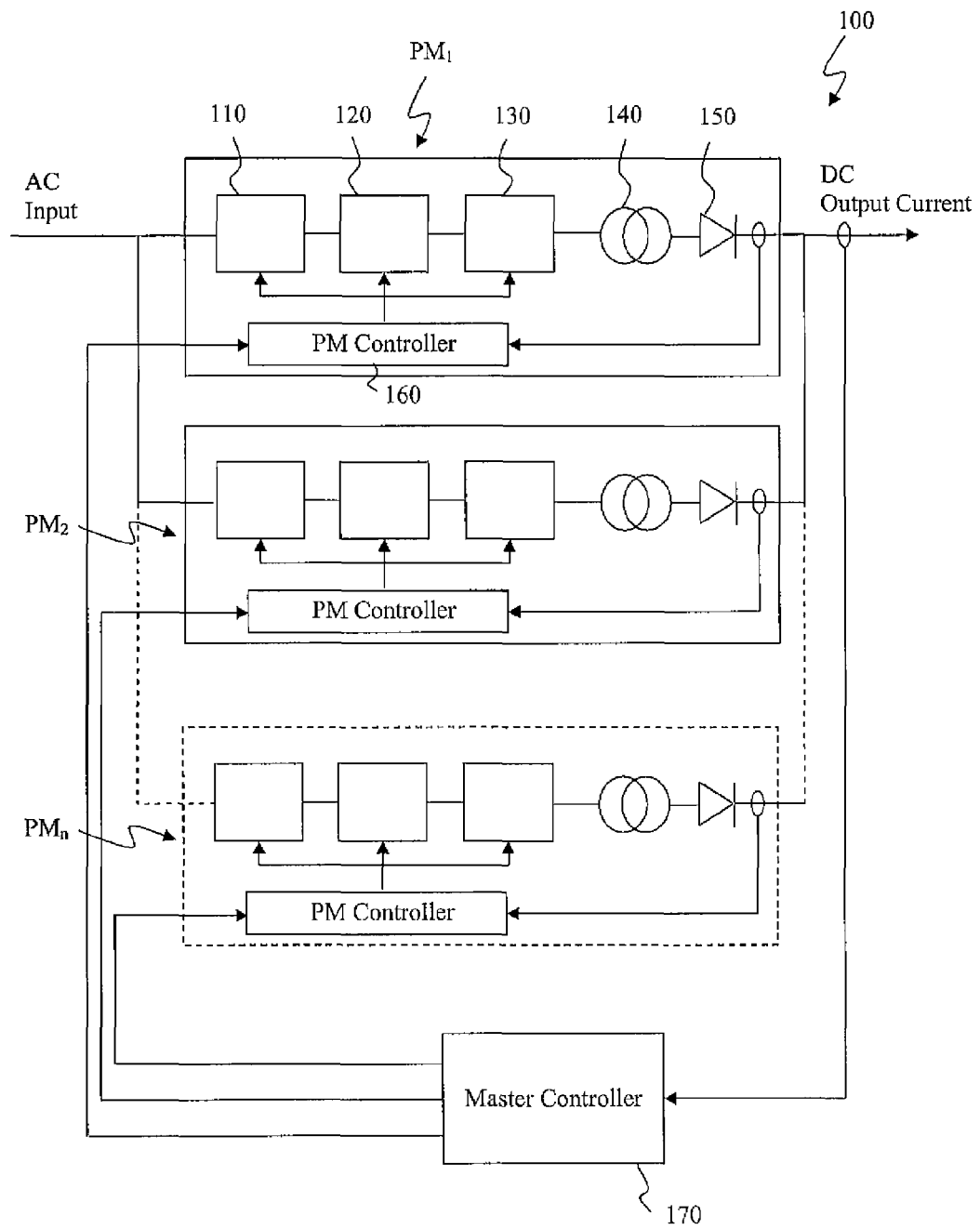
FIG. 2 depicts a conceptual diagram of a universal power supply for a plasma arc system according to an exemplary embodiment of the present disclosure.

With reference now to the Figures, exemplary embodiments of the present disclosure will now be discussed in detail. FIG. 2 depicts an exemplary power supply 100 that includes a plurality of power modules $PM_1$, $PM_2$ ... $PM_n$ connected in parallel. The DC output of each power module $PM_1$, $PM_2$ ... $PM_n$ is combined to provide a DC output current that can be used to sustain a plasma arc in a plasma arc system.

As illustrated, power supply 100 receives an AC input that is provided to each of the plurality of power modules $PM_1$, $PM_2$ ... $PM_n$. The AC input can be any of a variety of AC inputs available from a mains supply or other power source. For instance, in particular embodiments, the AC input can provide AC input voltages in the range of about 200V to about 600V, such as about 200/208V, 230/240V, 380/415V, 460/480V, 600V or other suitable AC input voltage. The AC input can be a single-phase, three-phase or multi-phase input and can have a frequency of about 50 Hz or about 60 Hz.

Each of the individual power modules $PM_1$, $PM_2$ ... $PM_n$ can be configured to receive the AC input and to provide a DC output. Each individual power module $PM_1$, $PM_2$ ... $PM_n$ includes a rectifier 110, a converter 120, an inverter 130, an isolation transformer 140 and an output rectifier 150. The rectifier 110 is configured to receive the AC input and to rectify the AC input to provide a first DC signal. Converter 120 is configured to receive the first DC signal and to provide a second DC signal. The inverter 130 is configured to receive the second DC signal and provide a high frequency AC output signal. The high frequency AC output signal is provided to isolation transformer 140 and to output rectifier 150. Output rectifier 140 rectifies the high frequency AC signal to a suitable DC output. A power module controller 160 is used to control at least one of the rectifier 110, converter 120 or inverter 130 to regulate the DC output of the power module.

In particular, rectifier 110 receives the AC input and rectifies the AC input to provide a first DC signal. Rectifier 110 can be a single-phase, three-phase, or multi-phase rectifier, and can be a controlled rectifier, a half controlled rectifier, or a fully controlled rectifier. Power module controller 160 can be coupled to rectifier 110 in order to regulate the first DC signal provided by rectifier 110. In this manner, power module controller 160 can control rectifier 110 to regulate the DC output of the power module.

Converter 120 is configured to receive the first DC signal to provide a second DC signal at a particular DC voltage. In particular embodiments, converter 120 can be a buck converter, a boost converter, or a buck/boost converter. Converter 120 can use a combination of high-speed switching devices, such as IGBTs or other suitable switching devices, and inductive elements to convert the first DC signal into the second DC signal. Converter 120 receives modulation commands, gate timing commands or other suitable control signals from power module controller 160. Power module controller 160 can be used to control the switching of the high speed switching devices in the converter 120 to regulate the second DC signal provided by converter 120.

In a particular embodiment, converter 120 can be controlled to provide for power factor correction. A standard rectifier circuit with a capacitive filter only draws current from the AC input power supply during the peak of the sine wave input. This results in a very high amplitude and narrow current pulse creating a lot of harmonic distortion leading to poor power factor. The output of the rectifier 110 can be short-circuited through the inductive elements and the switching elements of the converter 120 at the operating frequency of the converter 120. This forces current conduction through the line cycle. By using sine wave modulation for the switching element of converter 120, the AC input can be forced to be sinusoidal in nature resulting in reduced harmonic distortion and improved power factor.

Referring still to FIG. 2, inverter 130 receives the second DC signal provided by converter 120 and provides a high frequency AC signal. For instance, the frequency of the AC signal can be in the range of about 10 kHz to about 25 kHz. The high frequency of the AC signal can provide for faster response time during generation of the plasma arc in the plasma arc system. In particular embodiments, inverter 130 can include a full bridge inverter, a half bridge inverter, or a single ended forward converter stage. Inverter 130 uses a plurality of switching devices, such as IGBTs or other suitable switching devices, to invert the second DC signal provided by converter 120 using known PWM techniques. For instance, inverter 130 can receive modulation commands, gate timing commands, or other suitable control signals from power module controller 160. Power module controller 160 controls the switching of the high speed switching devices to regulate the AC signal provided by inverter 130.

Power module controller 160 is configured to control at least one of rectifier 110, converter 120 or inverter 130 to achieve a desired DC output for the power module. For instance, the power module controller 160 can regulate at least one of the first DC signal provided by rectifier 110, the second DC signal provided by the converter 120, or the high frequency AC signal provided by the inverter 130 to control the DC output of the power module.

Still referring to FIG. 2, isolation transformer 140 receives the AC signal provided by the inverter 130 and provides a second AC signal to output rectifier 150. Isolation transformer 140 can be smaller and less expensive relative to the large front end isolation transformers used in power supplies known in the prior art. Moreover, because power module controller 160 controls at least one of rectifier 110, converter 120 or inverter 130 to regulate the DC output of the power module, isolation transformer 140 does not require multiple taps for the power module to generate a DC output from a wide range of AC inputs.

Output rectifier 150 is used to rectify the second AC signal provided from inverter 130 through isolation transformer 140 into a suitable DC output for use in the plasma arc system. When multiple power modules are connected in parallel, such as power modules $PM_1$, $PM_2$ . . . $PM_n$ of FIG. 2, the DC outputs of each power module can be combined to provide a desired DC output current suitable for sustaining an electric arc for use in a plasma arc system.

Figure 4:
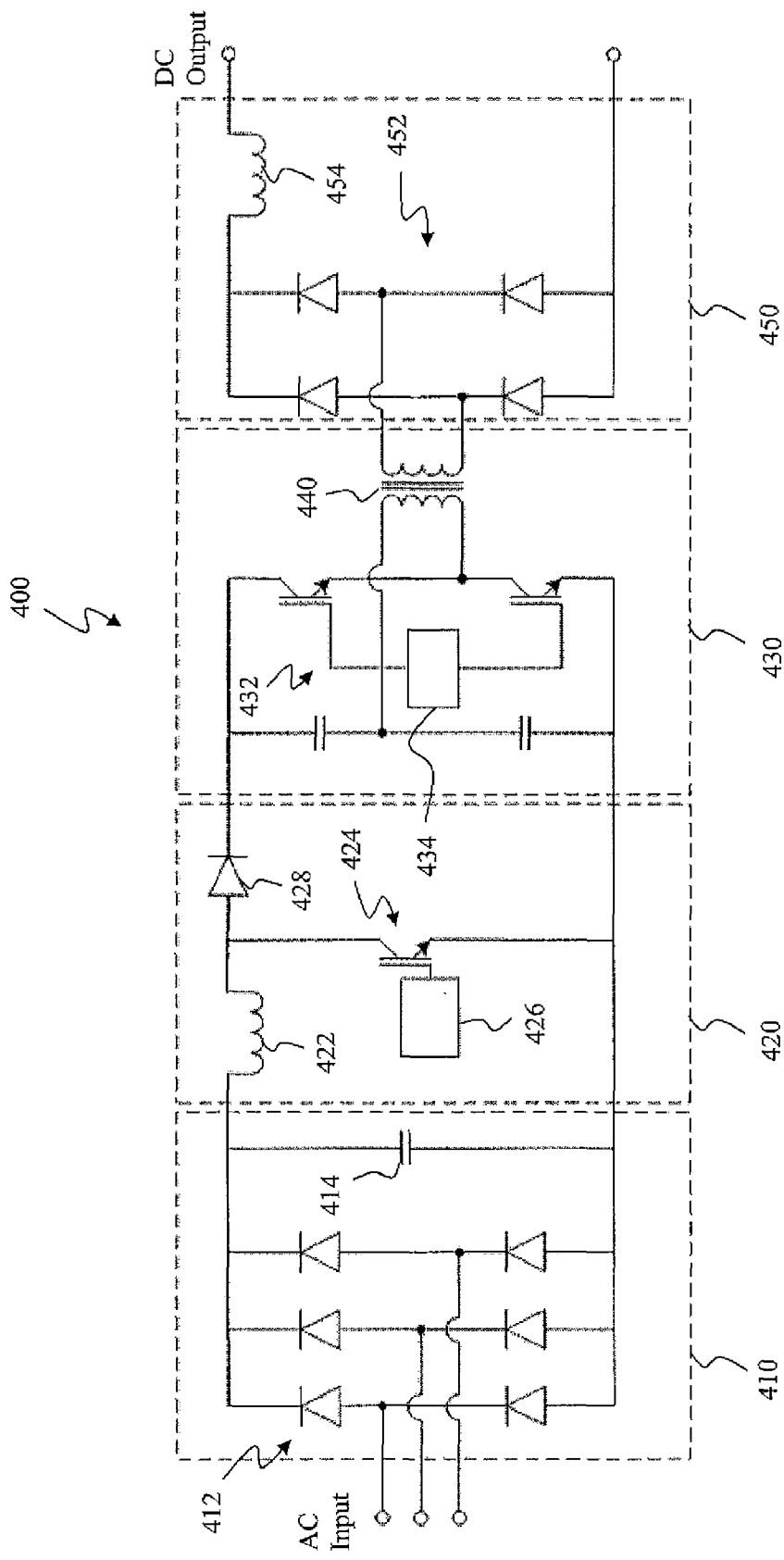
FIG. 4 depicts a circuit diagram of an exemplary power module for use in a universal power supply for a plasma arc system according to an exemplary embodiment of the present disclosure.

With reference now to FIG. 4, a circuit diagram for an exemplary power module 400 that can be used in accordance with an exemplary embodiment of the present disclosure will now be discussed in detail. Power module 400 includes a three-phase rectifier circuit 410, that includes a plurality of power electronic devices 412 that are used to rectify the input AC signal. Power electronic devices 412 can be, for instance, diodes or thyristors, depending on whether rectifier circuit 410 is an uncontrolled, half controlled, or fully controlled rectifier.

Capacitor 414 is used to filter the rectified AC signal to provide a rectified input signal to converter circuit 420. Converter circuit 420 includes an inductor 422 and one or more switching devices 424, such as IGBTs or other suitable switching devices that are controlled by a power module controller. The power module controller can provide modulation commands or other suitable control signals to the converter control circuit 426. Converter circuit 420 boosts the rectified input signal to a DC signal and provides the signal through diode 428 to inverter circuit 430.

Inverter circuit 430 includes one or more switching devices 432, such as IGBTs or other suitable switching devices that are configured to alternately conduct so as to provide a high frequency AC output signal of amplitude equal to the DC output signal of converter circuit 420. The switching devices 432 can be controlled by a power module controller that provides modulation commands or other suitable control signals to the inverter control circuit 434.

The AC signal provided by inverter circuit 430 passes through isolation transformer 440 to output rectifier circuit 450. Output rectifier circuit 450 can include one or more power electronic devices 452 that are used to rectify the AC signal provided by inverter circuit 430 into a suitable DC output. Power electronic devices 412 can be, for instance, diodes or thyristors, depending on whether output rectifier circuit 450 is an uncontrolled, half controlled, or fully controlled rectifier. Inductor 454 can be used to filter the DC output of power module 400.

Referring back to FIG. 2, an exemplary control system for power supply 100 will now be discussed in detail. Individual power module controllers 160 are used to provide modulation commands or other suitable control signals to at least one of the rectifier 110, converter 120 or inverter 130 to regulate the DC output of the individual power modules. Power module controller 160 can include a monitoring system or other sensing device that is used to monitor the DC output of the power module. The power module controller 160 can regulate the DC output of the power module based at least in part on the monitored DC output. Power module controller 160 can be any device configured to control at least one of rectifier 110, converter 120 or inverter 130. For instance, in one embodiment, power module controller 160 can include one or more regulators, such as proportional regulators, proportional integral regulators, proportional derivative regulators, or proportional integral derivative regulators, or other suitable devices to generate modulation commands or other suitable control signals for rectifier 110, converter 120 and/or inverter 130. In other embodiments, power module controller 160 can be a digital processor configured to control rectifier 110, converter 120 and/or inverter 130.

As illustrated in FIG. 2, power supply 100 also includes a master controller 170 that is used to control the individual power module controllers 160 to regulate the DC output current of power supply 100. Master controller 170 can be any device configured to control the individual power module controllers 160. For instance, in one embodiment, master controller 170 can include one or more regulators, such as proportional regulators, proportional integral regulators, proportional derivative regulators, or proportional integral derivative regulators, or other suitable analog devices to control the individual power module controllers 150. In other embodiments, master controller 170 can be a digital processor configured control the individual power module controllers 160.

Master controller 170 regulates the DC output current of power supply 100 by providing control signals to the individual power module controllers 160. For instance, master controller 170 can command each power module controller 160 to control its power module to provide a 100 ampere DC output. The 100 ampere DC output of each power module can then be combined to provide the DC output current of power supply 100. Master controller 170 can regulate the DC output current to be any of a wide variety of DC output currents by sending varying control signals to the power module controllers 160.

Master controller 170 can be configured to be operated as either an open loop control system or a closed loop control system. When being operated as an open loop control system, the master controller 170 simply provides control signals to the individual power module controllers 160 based on a desired DC output current for power supply 100. In this embodiment, the master controller 170 does not monitor the DC output current of the power supply 100 or make adjustments to the control signals provided to the individual power module controllers 160 based on the monitored DC output current.

In certain embodiments, master controller 170 is operated as a closed loop control system. In this embodiment, the master controller 170 monitors the DC output current of power supply 100 and makes adjustments to the control signals provided to the individual power module controllers 160 based on the monitored DC output current.

Figure 3:
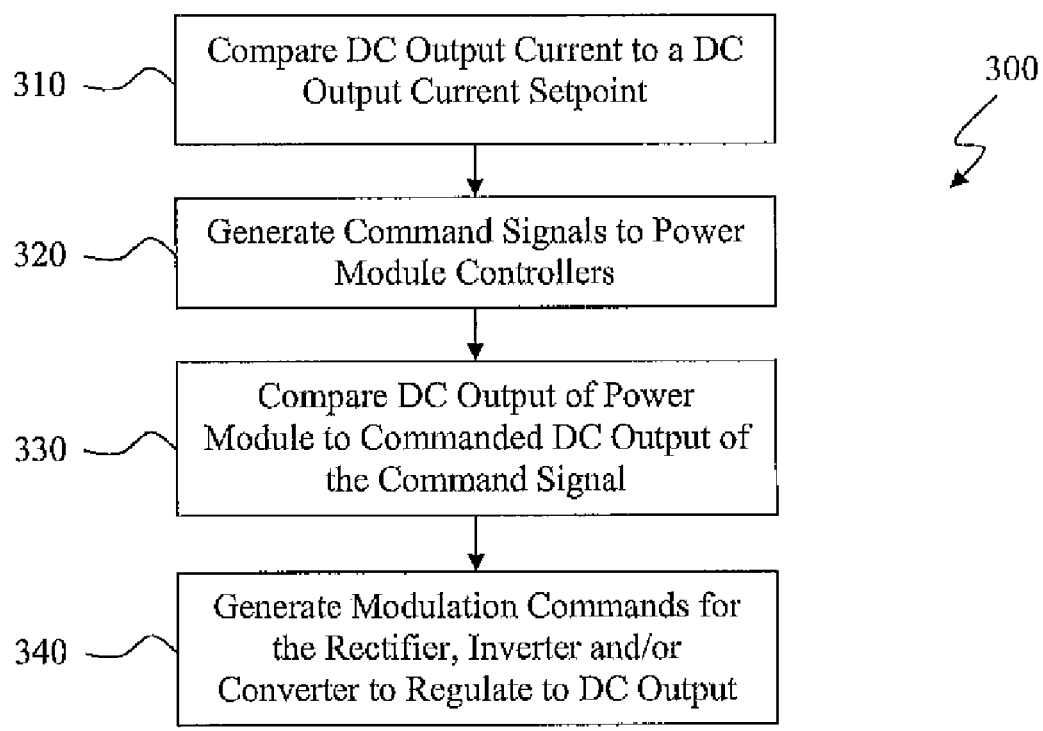
FIG. 3 depicts a flow diagram of the exemplary steps associated with a method according to an exemplary embodiment of the present disclosure.

With reference now to FIG. 3, a flow diagram illustrating the exemplary steps associated with a control method 300 according to an exemplary embodiment of the present disclosure will now be set forth. At 310, the master controller compares the monitored DC output current with a DC output current setpoint. The DC output current setpoint can be a predefined value that may or not be variable by a user during operation of the power supply. At 320, the master controller generates control signals to the individual power module controllers based on the comparison of the monitored DC output current with a DC output current setpoint. The control signals are provided to the power module controllers and direct the power module controllers to regulate the DC output of a power module to provide a DC output. The control signals may direct each power module controller to provide an equal DC output, or may direct the power module controllers to provide unequal DC outputs. The control signals can include a commanded DC output setpoint for the power module. At 330, the individual power module controllers compare a monitored DC output of the power module to the commanded DC output setpoint. At step 340, the individual power module controller provides suitable control signals to control at least one of the rectifier, the converter, or the inverter of the power module to regulate the DC output of the power module to be substantially equal to the commanded DC output.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A power supply for supplying a DC output current for use in a plasma arc system, said power supply comprising:
    a plurality of power modules connected in parallel, each said power module providing a DC output from an AC input, each said power module comprising a rectifier, a converter, an inverter and a power module controller, said power module controller configured to control at least one of said rectifier, said converter or said inverter to regulate the DC output of said power module;
    a master controller coupled to each of said power module controllers, said master controller configured to regulate the DC output current of said power supply,
    wherein said master controller is configured to monitor the DC output of said power supply, said master controller configured to control each of said power module controllers based at least in part on the DC output of said power supply.

2. The power supply of claim 1, wherein each said power module further comprises an isolation transformer and an output rectifier.

3. The power supply of claim 1, wherein said master controller is configured to provide a control signal to each of said power module controllers, said power module controllers regulating the DC output of said power module based at least in part on the control signal.

4. The power supply of claim 3, wherein the control signal comprises a DC output setpoint, said power module controller controlling at least one of said rectifier, said converter, or said inverter such that the DC output of said power module is substantially equal to the DC output setpoint.

5. The power supply of claim 1, wherein said power module controller is configured to monitor the DC output of said power module, said power module controller configured to control at least one of said rectifier, said inverter or said converter based at least in part on the DC output of said power module.

6. The power supply of claim 1, wherein said converter receives a first DC signal from said rectifier and provides a second DC signal, said power module controller regulating the second DC signal by providing a converter modulation control signal to said converter.

7. The power supply of claim 6, wherein said inverter receives the second DC signal of said converter and provides an AC signal, said power module controller regulating the AC signal by providing an inverter modulation command to said inverter.

8. The power supply of claim 6, wherein said power module controller regulates the DC output of said power module by controlling at least one of the first DC signal, the second DC signal, or the AC signal.

9. The power supply of claim 1, wherein said power module controller provides a sine wave modulation command to said converter to regulate power factor for said power supply.

10. A method for providing a DC output current for use in a plasma arc system, comprising:
providing an AC input to a plurality of power modules connected in parallel,
rectifying the AC input in each power module with a rectifier to provide a first DC signal,
converting the first DC signal to a second DC signal in each power module with a converter,
converting the second DC signal to an AC signal at each power module with an inverter;
rectifying the AC signal at each power module with an output rectifier to provide a DC output;
monitoring with a master controller the combined DC output provided by the plurality of power modules connected in parallel;
generating a control signal at the master controller based at least in part on the monitored DC output;
providing the control signal to at least one power module controller from the master power controller; and
controlling at least one of the rectifier, the converter, or the inverter to control the DC output of the power module based on the control signal.

11. The method of claim 10, wherein said step of controlling at least one of the rectifier, the converter, or the inverter comprises:
monitoring the DC output of one of the plurality of power modules; and
controlling the DC output of the power module based at least in part on the monitored DC output.

12. The method of claim 10, wherein said step of controlling at least one of the rectifier, the converter, or the inverter comprises providing a modulation command to the converter.

13. The method of claim 10, wherein said step of controlling at least one of the rectifier, the converter, or the inverter comprises providing a modulation command to the inverter.

14. The method of claim 10, wherein said step of controlling at least one of the rectifier, the converter, or the inverter comprises providing a sine wave modulation command to the converter.

15. A universal power supply for use in a plasma arc system, comprising:
a plurality of power modules connected in parallel to provide a DC output current, each said power module configured to provide a DC output from an AC input, each said power module comprising:
a rectifier configured to receive the AC input and provide a first DC signal;
a converter coupled to said rectifier, said converter configured to receive the first DC signal and provide a second DC signal;
an inverter coupled to said converter, said inverter configured to receive the second DC signal and provide a first AC signal;
an isolation transformer coupled to said inverter, said isolation transfer configured to receive the first AC signal and provide a second AC signal;
an output rectifier coupled to said isolation transformer, said output rectifier configured to receive the second AC signal and provide the DC output; and
a control system comprising a plurality of power module controllers and a master controller, each said power module controller configured to control the DC output of one of said plurality of power modules by controlling at least one of said rectifier, said converter, or said inverter of said power module,
wherein said master controller is configured to control the DC output current of said universal power supply by providing a control signal to at least one of said plurality of power module controllers, said control signal based at least in part on a monitored DC output of said universal power supply.

16. The power supply of claim 15, wherein the control signal comprises a DC output setpoint, said power module controller configured to control the DC output of said power module to be substantially equal to the DC output setpoint.

17. The power supply of claim 15, wherein each said power module controller is configured to monitor the DC output of said power module, said power module controller configured control at least on of said rectifier, said converter, or said inverter based at least in part on the DC output.

* * * * *